US011984121B2

(12) United States Patent
Fukui et al.

(10) Patent No.: US 11,984,121 B2
(45) Date of Patent: May 14, 2024

(54) INFORMATION PROCESSING DEVICE TO STOP THE TURN OFF OF POWER BASED ON VOICE INPUT FOR VOICE OPERATION

(71) Applicant: SONY GROUP CORPORATION, Tokyo (JP)

(72) Inventors: Akira Fukui, Tokyo (JP); Hiroaki Ogawa, Tokyo (JP); Yoshinori Maeda, Tokyo (JP); Chie Kamada, Tokyo (JP); Emiru Tsunoo, Tokyo (JP); Akira Takahashi, Tokyo (JP); Noriko Totsuka, Tokyo (JP); Kazuya Tateishi, Tokyo (JP); Yuichiro Koyama, Tokyo (JP); Yuki Takeda, Tokyo (JP); Hideaki Watanabe, Tokyo (JP); Kan Kuroda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 300 days.

(21) Appl. No.: 17/425,444

(22) PCT Filed: Jan. 17, 2020

(86) PCT No.: PCT/JP2020/001413
§ 371 (c)(1),
(2) Date: Jul. 23, 2021

(87) PCT Pub. No.: WO2020/158435
PCT Pub. Date: Aug. 6, 2020

(65) Prior Publication Data
US 2022/0101850 A1 Mar. 31, 2022

(30) Foreign Application Priority Data

Feb. 1, 2019 (JP) .................. 2019-016640

(51) Int. Cl.
G10L 15/22 (2006.01)
G06F 3/16 (2006.01)
G10L 15/28 (2013.01)

(52) U.S. Cl.
CPC ................ *G10L 15/22* (2013.01); *G06F 3/16* (2013.01); *G10L 15/28* (2013.01);
(Continued)

(58) Field of Classification Search
None
See application file for complete search history.

(56) References Cited

U.S. PATENT DOCUMENTS 8,650,036 B2 * 2/2014 Han ................ H04N 21/42204
704/275
9,396,737 B2 * 7/2016 Cha .......................... G10L 21/00
(Continued)

FOREIGN PATENT DOCUMENTS

CN 103187054 A 7/2013
EP 2610863 A2 7/2013
(Continued)

OTHER PUBLICATIONS

Translation of WO2018/123443 A1 (Year: 2018).*
(Continued)

*Primary Examiner* — Richard Z Zhu
(74) *Attorney, Agent, or Firm* — CHIP LAW GROUP

(57) ABSTRACT

An information processing device presents first information indicating that voice input for the voice operation is possible and second information representing a domain of utterance in which voice operation is possible in response to an occurrence of a predetermined state transition, and performs voice recognition for voice input by a user.

12 Claims, 13 Drawing Sheets

(52) U.S. Cl.
CPC .. *G10L 2015/221* (2013.01); *G10L 2015/223* (2013.01); *G10L 2015/225* (2013.01); *G10L 2015/228* (2013.01)

(56) References Cited

U.S. PATENT DOCUMENTS

| | | | | |
|---|---|---|---|---|
| 9,431,008 | B2* | 8/2016 | Robichaud | G10L 15/18 |
| 10,877,637 | B1* | 12/2020 | Antos | G06F 21/32 |
| 2009/0253463 | A1* | 10/2009 | Shin | H04W 4/16 |
| | | | | 704/E15.001 |
| 2013/0169524 | A1 | 7/2013 | Han et al. | |
| 2014/0012573 | A1* | 1/2014 | Hung | G10L 15/28 |
| | | | | 704/E15.039 |
| 2014/0214430 | A1* | 7/2014 | Wang | G10L 15/22 |
| | | | | 704/275 |
| 2019/0096401 | A1 | 3/2019 | Honda et al. | |
| 2020/0365139 | A1* | 11/2020 | Kawano | G06F 3/01 |
| 2022/0365669 | A1* | 11/2022 | de Vries | G06F 3/0485 |

FOREIGN PATENT DOCUMENTS

| | | |
|---|---|---|
| JP | 2009-109587 A | 5/2009 |
| JP | 2013-140359 A | 7/2013 |
| JP | 2013-198085 A | 9/2013 |
| KR | 10-2013-0078486 A | 7/2013 |
| WO | 2017/175351 A1 | 10/2017 |
| WO | 2018/123443 A1 | 7/2018 |
| WO | WO-2018123443 A1 * | 7/2018 |

OTHER PUBLICATIONS

International Search Report and Written Opinion of PCT Application No. PCT/JP2020/001413, dated Mar. 24, 2020, 11 pages of ISRWO.

* cited by examiner

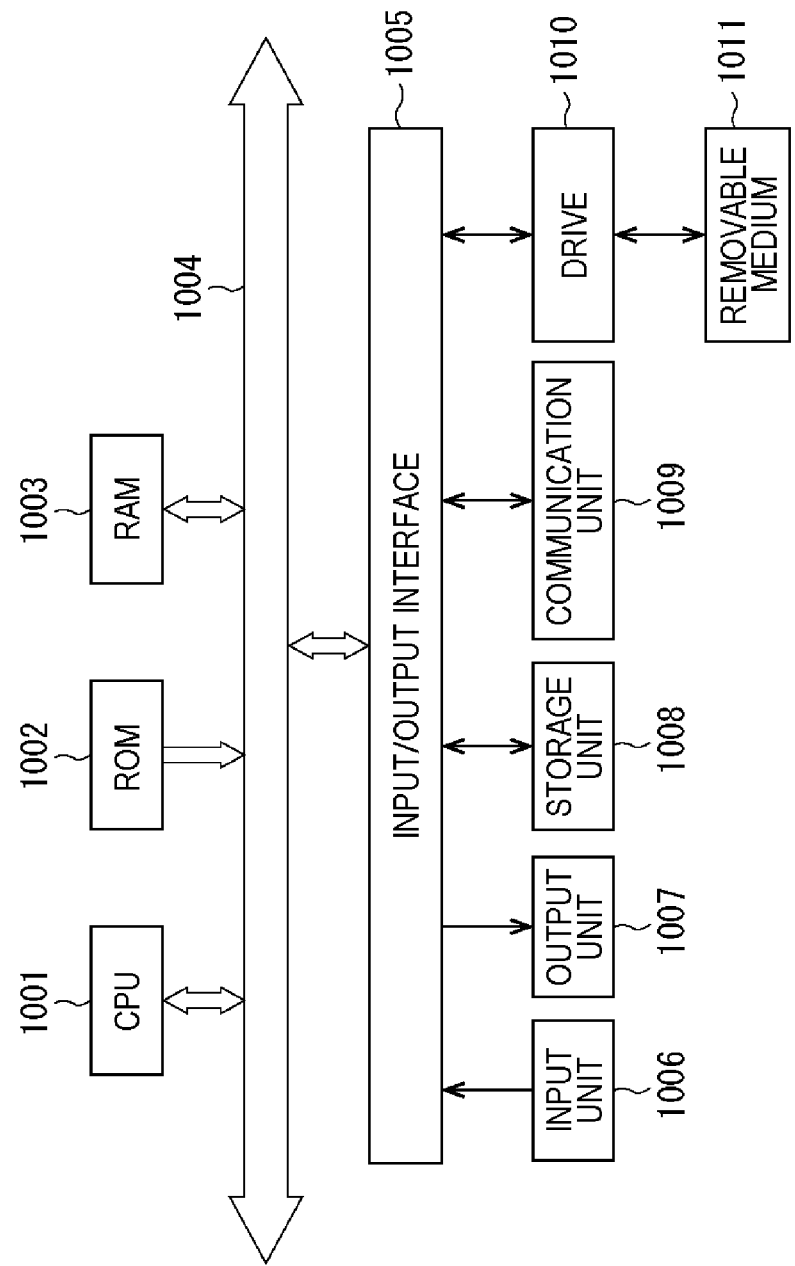

INFORMATION PROCESSING DEVICE TO STOP THE TURN OFF OF POWER BASED ON VOICE INPUT FOR VOICE OPERATION

CROSS REFERENCE TO RELATED APPLICATIONS

This application is a U.S. National Phase of International Patent Application No. PCT/JP2020/001413 filed on Jan. 17, 2020, which claims priority benefit of Japanese Patent Application No. JP 2019-016640 filed in the Japan Patent Office on Feb. 1, 2019. Each of the above-referenced applications is hereby incorporated herein by reference in its entirety.

TECHNICAL FIELD

The present technology relates to an information processing device, an information processing method, and a program, and more particularly to an information processing device, an information processing method, and a program that enable voice operation by intuitive expression.

BACKGROUND ART

In recent years, the number of apparatuses adapted to voice operation has increased. In addition to speakers so-called smart speakers, some home appliances such as television receivers (TVs), robot vacuum cleaners, lighting apparatuses, and air conditioners are equipped with voice operation functions.

CITATION LIST

Patent Document

Patent Document 1: Japanese Patent Application Laid-Open No. 2013-198085

SUMMARY OF THE INVENTION

Problems to be Solved by the Invention

Incidentally, an example of the function of the home appliance as described above is a timer function such as automatic power off or automatic power on. For example, in a case where a TV is on and no operation is performed for a specified period of time, a message indicating that the power will be turned off soon is displayed, and then the automatic power off function will be used to turn off the power of the TV.

In a case where the user wants to continue viewing/listening the broadcast program as it is, the user needs to press a button on the main unit or pick up and operate the remote control. According to operation such as pressing a button on the main unit, automatic power off is canceled and the broadcast program continues to be displayed. That is, such planned transition may occur at an unintended timing, which needs to be dealt with by the user.

It would be convenient if the operation for canceling automatic power off could be performed by voice operation as described above. Furthermore, it would be even more convenient if voice operation for canceling automatic power off could be performed without saying an activation word.

The present technology has been made in view of such a situation, and makes it possible to perform voice operation by intuitive expression.

Solution to Problems

An information processing device according to one aspect of the present technology includes a presentation control unit that presents first information indicating that voice for voice operation can be input and second information representing a domain of utterance in which voice operation is possible in response to an occurrence of a predetermined state transition, and a voice recognition unit that performs voice recognition for voice input by a user.

In one aspect of the present technology, first information indicating that voice for voice operation can be input and second information representing a domain of utterance in which voice operation is possible are presented in response to an occurrence of a predetermined state transition, and voice recognition is performed for voice input by a user.

BRIEF DESCRIPTION OF DRAWINGS

FIG. 13 is a block diagram illustrating a configuration example of a computer.

MODE FOR CARRYING OUT THE INVENTION

Hereinafter, embodiments for implementing the present technology will be described. The description will be given in the following order.

1. Example of operating TV
2. Example of operating robot vacuum cleaner
3. Example of presenting information
4. Configuration and actions of device
5. Application example
6. Others <<Example of Operating TV>>

Figure 1:
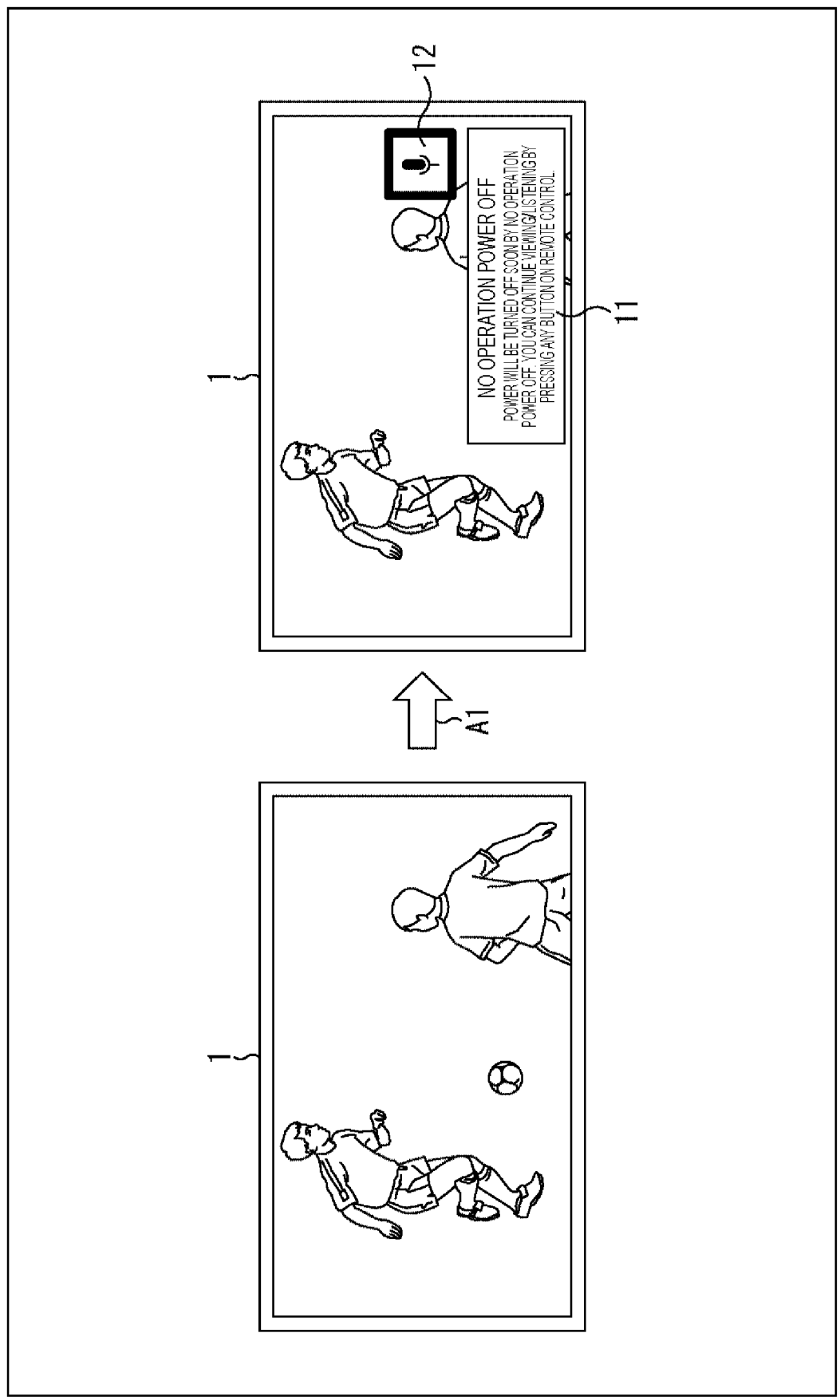
FIG. 1 is a diagram illustrating a display example of a TV.

FIG. 1 is a diagram illustrating a display example of a TV according to an embodiment of the present technology.

A TV 1 illustrated in FIG. 1 is an information processing device capable of receiving broadcast waves to display an image of a broadcast program on a display or to output voice from a speaker. The TV 1 is connected to the Internet and appropriately communicates with a server, not illustrated.

The TV 1 can be operated not only by using a remote control but also by voice operation. The TV 1 is a device adapted to voice operation. A microphone is provided at a predetermined position on the housing of the TV 1.

The user can perform various operations such as searching for a broadcast program, searching for a video distributed by a video distribution service, searching for a website, and switching channels, with voice. It is also possible to operate an external device connected to the TV 1 with voice.

In the case of using such a voice operation function, the user basically needs to make an utterance in which an activation word and the content of a request are combined. There is also a system that allows voice operation to be performed only by uttering the content of a request without uttering an activation word.

Here, an activation word is a word that is a trigger for starting voice recognition.

The TV 1 turns into a state capable of accepting the content of a request in response to detection of the activation word, and voice recognition is performed for the utterance made following the activation word. Furthermore, processing such as switching channels is performed according to the content of the request specified by voice recognition. Input of the content of a request using voice is input of a voice command.

As described, voice operation of the TV 1 is basically performed by the utterance in which an activation word and the content of a request are combined; however, depending on the state of the TV 1, voice operation of the TV 1 is performed only by the utterance of the content of a request without an activation word. Voice operation without an activation word is possible, for example, in a case where predetermined state transition that serves as a trigger occurs in the TV 1.

As illustrated on the left side of FIG. 1, in a case where a user is viewing/listening a predetermined broadcast program, when a preset time such as one hour elapses without performing any operation, the state of the TV 1 becomes a state where power is automatically turned off by the no operation power off function. In this example, it is assumed that the user has set the no operation power off function, which is a function of automatically turning off the power after a certain period of time has passed in the state of no operation, as valid.

In a case where a state where the power is automatically turned off is reached, as indicated by an arrow A1, the TV 1 displays a message 11 indicating that the power will be turned off by the no operation power off function such that the message 11 is superimposed on the image of the broadcast program. In the example of FIG. 1, the message 11 presents the content indicating that the power will be turned off by the no operation power off function, and the power off can be stopped and the broadcast program can be continued to be viewed/listened by performing any operation using the remote control.

Furthermore, the TV 1 displays a voice input icon 12 indicating that voice input for voice operation is possible together with the message 11. In the example of FIG. 1, a voice input icon 12 including a symbol of a microphone is displayed above the message 11.

While the voice input icon 12 is displayed, voice operation without the activation word is possible. That is, in this example, in a case where a state in which the power is automatically turned off by the no operation power off function is reached, the TV 1 starts accepting voice operation without the activation word, triggered by transition to the state. The TV 1 waits for the user to make an utterance, and in a case where the utterance is made, the TV 1 accepts the utterance as voice operation utterance and performs voice recognition.

Figure 2:
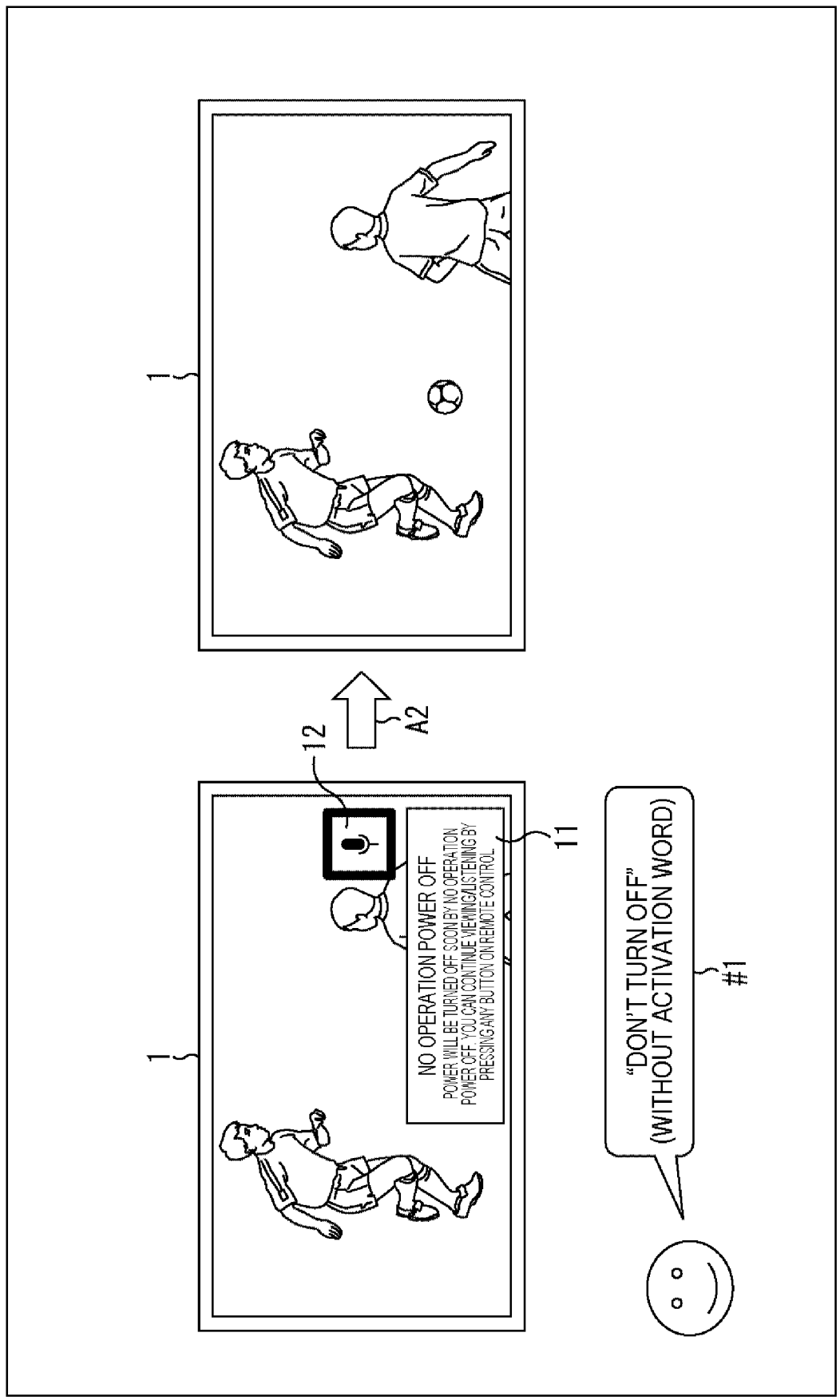
FIG. 2 is a diagram illustrating a display example of the TV.

For example, as indicated in a balloon #1 in FIG. 2, in a case where the user makes an utterance "Don't turn off", the TV 1 recognizes the user's utterance as an utterance requesting to stop power off and stops power off. When power off is stopped, the TV 1 ends display of the message 11 and the voice input icon 12 and continues to display the broadcast program, as indicated by an arrow A2.

Figure 3:
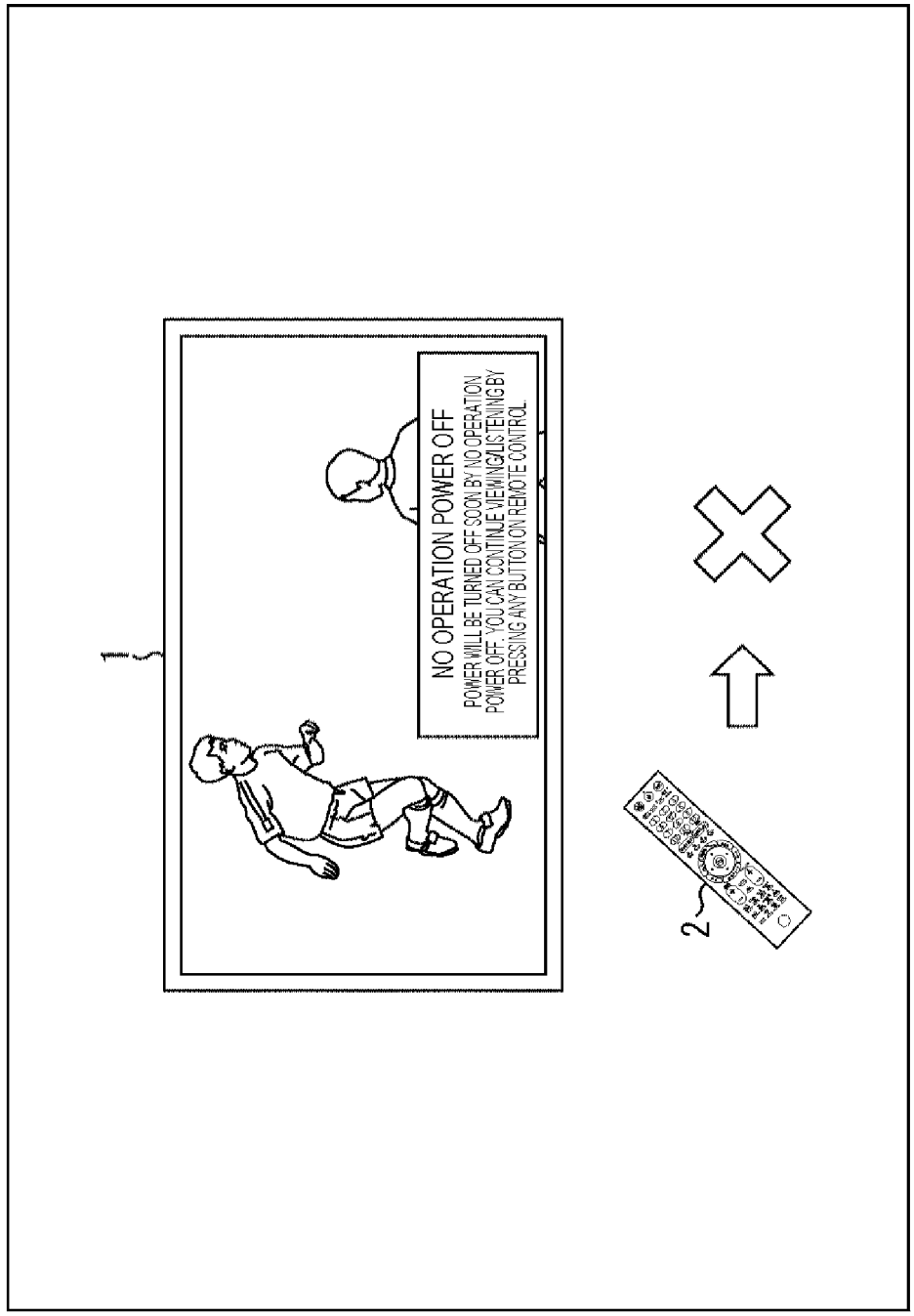
FIG. 3 is a diagram illustrating operation using a remote control.

As described, since it is possible to stop power off by voice operation, the user does not have to search for and operate the remote control 2 as illustrated in FIG. 3.

Furthermore, since voice operation without an activation word is possible, the user can stop power off only by uttering the content of a request such as "Don't turn off". The user can easily perform voice operation by intuitive utterance in which the activation word is omitted.

In a case where the voice input icon 12 is displayed in response to the fact that the state in which the power is automatically turned off by the no operation power off function is reached, in that state, it is highly likely that the user will make an utterance regarding the no operation power off function.

The TV 1 assumes that an utterance regarding the no operation power off function will be performed, and performs voice recognition by designating the domain of utterance regarding the no operation power off function as the domain of utterance for voice recognition. Therefore, accuracy of voice recognition can be improved.

Assuming that the domain is not designated, it is difficult to specify the content of the user's request simply from the utterance "Don't turn off". For example, it is also possible to specify that a request not to turn off display of the message 11 is being made.

The TV 1 assumes that an utterance regarding the no operation power off function will be made on the basis of the state (context) of the TV 1, and narrows down the utterance "Don't turn off" to the utterance regarding the no operation power off function. Thus, the TV 1 can specify that the utterance "Don't turn off" is a request to stop power off.

Note that similarly, in a case where utterances such as "Stop", "No", "Extend by one hour", and the like are made in addition to "Don't turn off", the utterances are specified as a request to stop power off by voice recognition designating the domain. For example, in a case where the utterance "Extend by one hour" is made, the power-off time point is reset to the time point after one hour passes in the TV 1.

Figure 4:
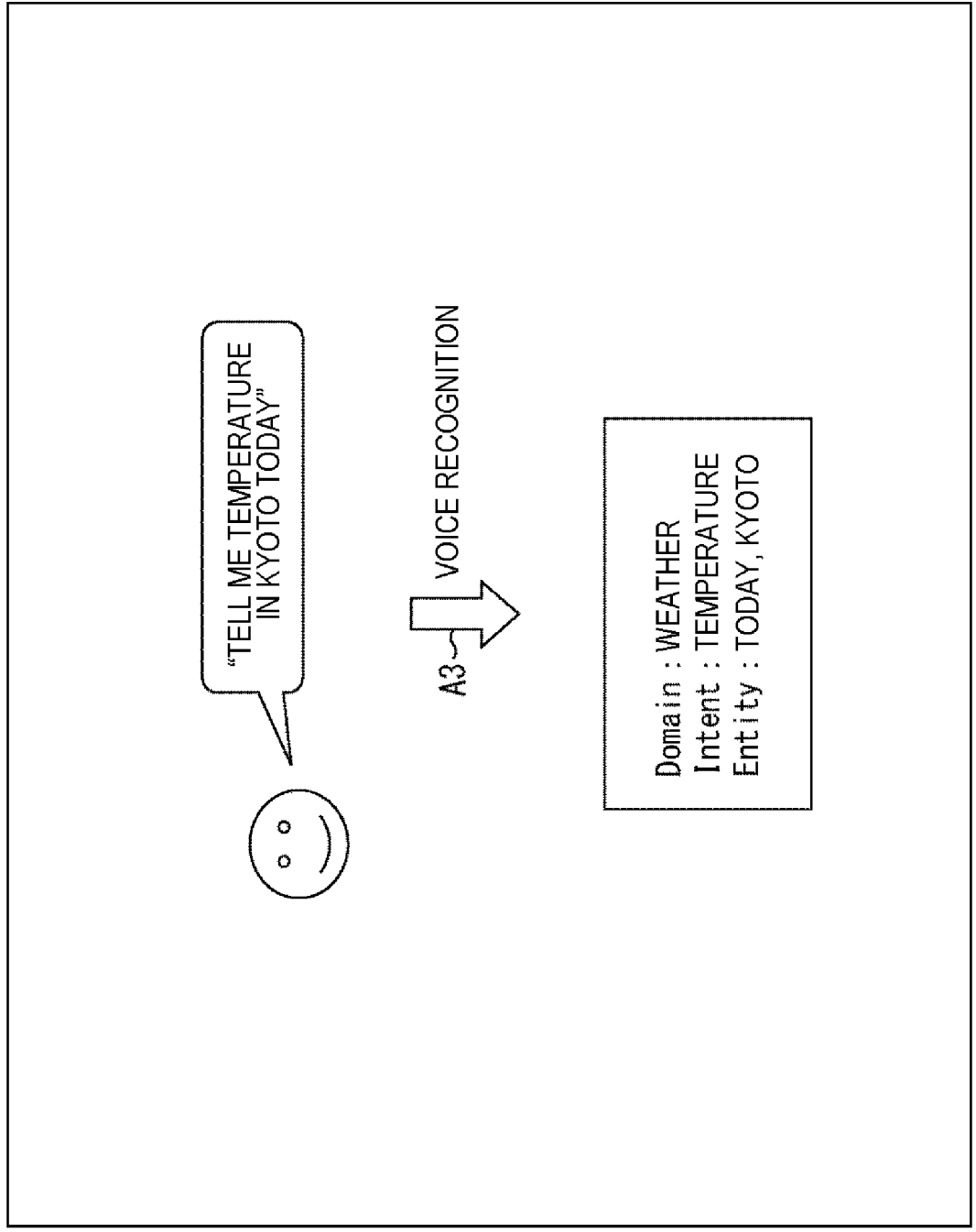
FIG. 4 is a diagram illustrating an example of voice recognition.

FIG. 4 is a diagram illustrating an example of voice recognition.

As illustrated in FIG. 4, for example, in a case where the utterance "Tell me the temperature in Kyoto today" is made, voice recognition is performed, and as indicated by an arrow A3, the domain is specified as "weather" and the intent is specified as "temperature". Furthermore, entities such as "today" and "Kyoto" are specified.

Voice recognition for user utterance includes text conversion and language analysis processing. Text conversion is a process of converting voice into text data. In contrast, a language analysis is a process of specifying the domain, the intent, and entities by performing a morphological analysis or the like of text data obtained by text conversion.

As described, the domain represents the range of utterance. In addition to the range of utterance, the domain also includes meanings such as the content of a conversation, a topic, a range, classification, an instruction, and a dialogue. Furthermore, the intent represents the intention of the user.

An entity represents a word contained in an utterance. A domain, an intent, and entities represent the content of the user's request.

In general, in a case where it is known in advance that an utterance regarding the weather will be made, the intent or the like can be narrowed down by designating the domain as "weather" and performing voice recognition. Therefore, it is possible to improve the recognition accuracy of utterance regarding the weather.

In the TV 1, such voice recognition allows the content of the user's request to be specified on the basis of the utterance without the activation word, and processing according to the content of the request is performed.

<<Example of Operating Robot Vacuum Cleaner>>

The information processing device that performs the above-described voice recognition triggered by an occurrence of a predetermined state transition and performs processing according to the user's request content can be applied to various apparatuses.

Figure 5:
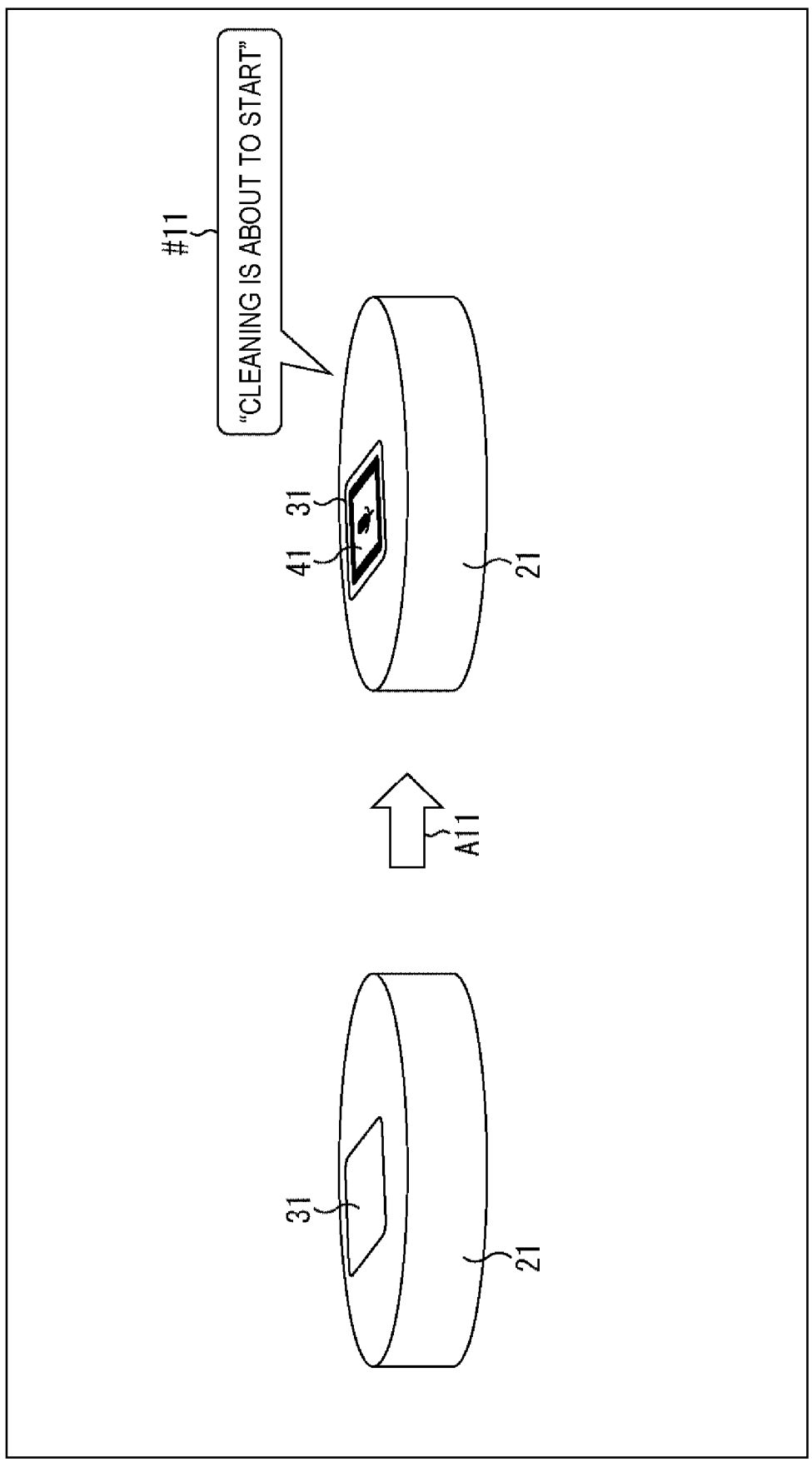
FIG. 5 is a diagram illustrating a display example of a robot vacuum cleaner.

FIG. 5 is a diagram illustrating a display example of a robot vacuum cleaner.

The robot vacuum cleaner 21 illustrated in FIG. 5 is an information processing device that moves, for example, in a room by a wheel provided on the bottom surface and autonomously cleans according to detection results from various sensors.

Similarly to the TV 1, the robot vacuum cleaner 21 can be operated not only by using a remote control but also by voice operation. The robot vacuum cleaner 21 is a device adapted to voice operation. A microphone is provided at a predetermined position on a housing having a flat cylindrical shape.

The user can perform various operations such as start/end of cleaning, automatic return to a charger, and timer setting for starting cleaning, with voice.

Voice operation of the robot vacuum cleaner 21 is also basically performed by an utterance in which an activation word and the content of a request are combined; however, depending on the state of the robot vacuum cleaner 21, voice operation is performed only by utterance of the content of the request without the activation word. Voice operation without the activation word is possible, for example, in a case where predetermined state transition that serves as a trigger occurs in the robot vacuum cleaner 21.

As illustrated on the left side of FIG. 5, in a case where the robot vacuum cleaner 21 is on standby in the standby state, when the time point set as the cleaning start time is reached, the state of the robot vacuum cleaner 21 is activated by the timer function and is ready to start cleaning. In this example, it is assumed that the user has set the timer function, which is the function of automatic activation (releasing the standby state) and starting cleaning, to be valid.

In a case where the robot vacuum cleaner 21 is ready to start cleaning, the robot vacuum cleaner 21 outputs a synthetic voice indicating that cleaning will be started by the timer function, as indicated in a balloon #11 in front of the head of an arrow A11. In the example of FIG. 5, the synthetic voice of "Cleaning is about to start" is output from a speaker, not illustrated.

Furthermore, the robot vacuum cleaner 21 displays a voice input icon 41 indicating that voice for voice operation can be input together with output of the synthetic voice. In the example of FIG. 5, a voice input icon 41 is displayed on a display 31 provided on the upper surface of the housing.

While the voice input icon 41 is displayed, voice operation without the activation word is possible. That is, in this example, in a case where a state in which cleaning is started is reached by the timer function, the robot vacuum cleaner 21 starts accepting voice operation without the activation word, triggered by transition to the state. The robot vacuum cleaner 21 waits for the user to make an utterance, and in a case where the utterance is made, the robot vacuum cleaner 21 accepts the utterance as an utterance of voice operation and performs voice recognition.

Figure 6:
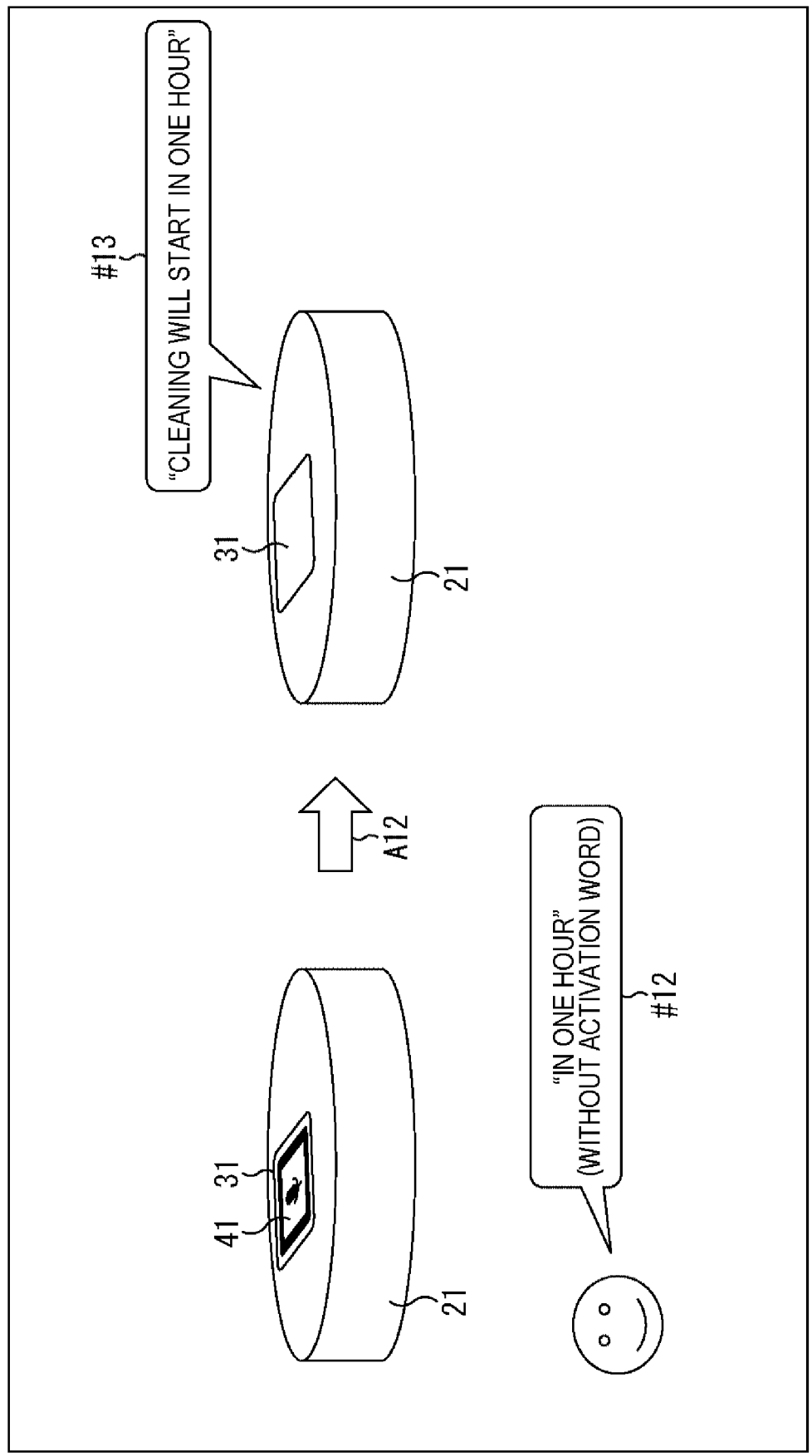
FIG. 6 is a diagram illustrating a display example of the robot vacuum cleaner.

For example, as indicated in a balloon #12 in FIG. 6, in a case where the user makes an utterance "In one hour, please", the robot vacuum cleaner 21 recognizes the user's utterance as an utterance requesting to delay the cleaning start time by one hour and stops start of cleaning. When start of cleaning is stopped, the robot vacuum cleaner 21 outputs synthetic voice "Cleaning will start in one hour" as illustrated in a balloon #13 in front of the head of an arrow A12, and then ends display of the voice input icon 41 and remains on standby. In the robot vacuum cleaner 21, the cleaning start time point is reset.

In a case where the timer function is set to start cleaning at 2 o'clock at night, the user can stop cleaning from starting at a time when it is inconvenient for the user by resetting the cleaning start time point by making the above-described utterance at time when it is inconvenient for the user, or the like. Note that similarly, in a case where an utterances such as "No, today", or the like is made in addition to "In one hour, please", such an utterance is specified as a request to stop start of cleaning by voice recognition designating the domain.

As described, since it is possible to stop start of cleaning by voice operation, the user does not need to operate the remote control or the like to reset the cleaning start time point.

Furthermore, since voice operation without the activation word is possible, the user can stop start of cleaning only by uttering the content of a request such as "In one hour, please".

In a case where the voice input icon 41 is displayed in response to the fact that the state in which cleaning is started is reached by the timer function, it is highly likely that the user will make an utterance regarding the timer function in that state.

The robot vacuum cleaner 21 assumes that an utterance regarding the timer function will be performed, and performs voice recognition by designating the domain of utterance regarding the timer function as the domain of utterance for voice recognition. Therefore, accuracy of voice recognition can be improved.

Note that in a case where the robot vacuum cleaner 21 is not provided with the display 31, the user may be informed by light emission of an LED that voice operation is possible. The LED as a light emitting unit for presenting information to the user is provided at a predetermined position on the housing. Synthetic voice may indicate that voice operation is possible.

As described, performing voice recognition for an utterance without an activation word by using the occurrence of predetermined state transition as a trigger and performing processing according to the content of the user's request can be applied to various apparatuses.

<<Example of Presenting Information>>

Figure 7:
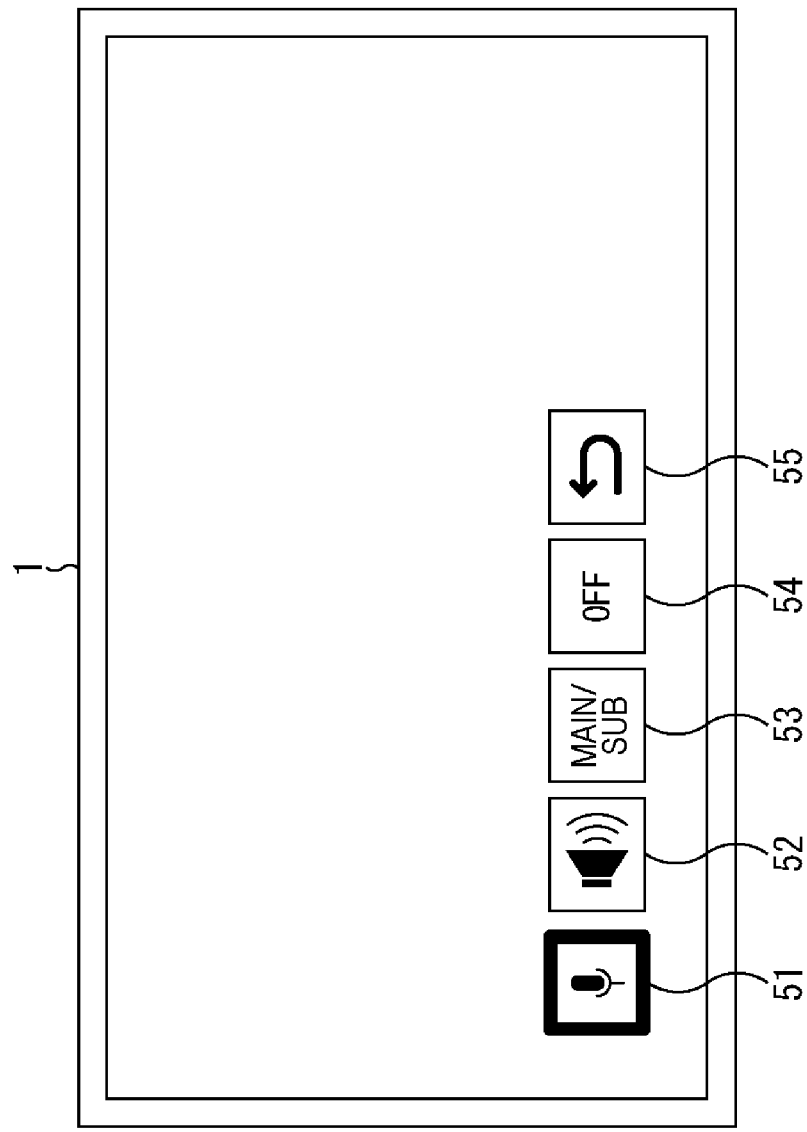
FIG. 7 is a diagram illustrating an example of presenting information.

FIG. 7 is a diagram illustrating an example of presenting information.

In addition to the fact that voice operation is possible, the domain of utterance in which voice operation is possible by an utterance without an activation word may be presented by an icon as a voice input mode.

In the example of FIG. 7, voice input mode icons 52 to 55 representing voice input modes are displayed side by side with a voice input icon 51 indicating that voice for voice operation can be input. The voice input icon 51 is an icon similar to the voice input icon 12 in FIG. 1.

The voice input mode icon 52 that includes a symbol of a speaker represents the domain of utterance regarding volume adjustment of the speaker. Voice recognition for voice input when the voice input mode icon 52 is displayed is performed by designating the domain of utterance regarding volume adjustment of the speaker. For example, in a case where voice "Louder" is input, since the domain is designated, it is specified that the content of the user's request is to increase the volume.

The voice input mode icon 53 that includes the characters "main/sub" represents the domain of utterance regarding voice switching between the main voice and the sub voice. Voice recognition for voice input when the voice input mode icon 53 is displayed is performed by designating the domain of utterance regarding voice switching between the main voice and the sub voice. For example, in a case where the voice of "sub voice" is input, since the domain is designated, the user's request content is specified as switching the voice to, for example, English which is the sub voice.

The voice input mode icon 54 that includes letters "OFF" represents the domain of utterance regarding power off. The voice recognition for voice input when the voice input mode icon 54 is displayed is performed by designating the domain of utterance regarding power off. For example, in a case where voice "Off" is input, since the domain is designated, the content of the user's request is specified as turning off the power.

The voice input mode icon 55 that includes a sideways U-shaped arrow represents the domain of utterance regarding screen display. Voice recognition for the voice input when the voice input mode icon 55 is displayed is performed by designating the domain of utterance regarding screen display. For example, in a case where voice "Return" is input, since the domain is designated, the content of the user's request is specified as returning the screen display to the previous screen.

As described, the icon representing the domain of utterance in which the content of a request can be recognized without an activation word may be displayed together with the icon indicating that voice for voice operation can be input.

From such display, the user can check that voice operation is possible and the domain of utterance in which the content of a request can be recognized without an activation word, and can perform voice operation.

The domain of utterance in which the content of a request can be recognized without an activation word may be presented by display of a character/letter instead of an icon, output of voice or sound effect, or light emission of a light emitting unit such as an LED. In a case where the domain of utterance is presented by light emission of the LED, for example, the types of domain are presented by light in different colors.

Figure 8:
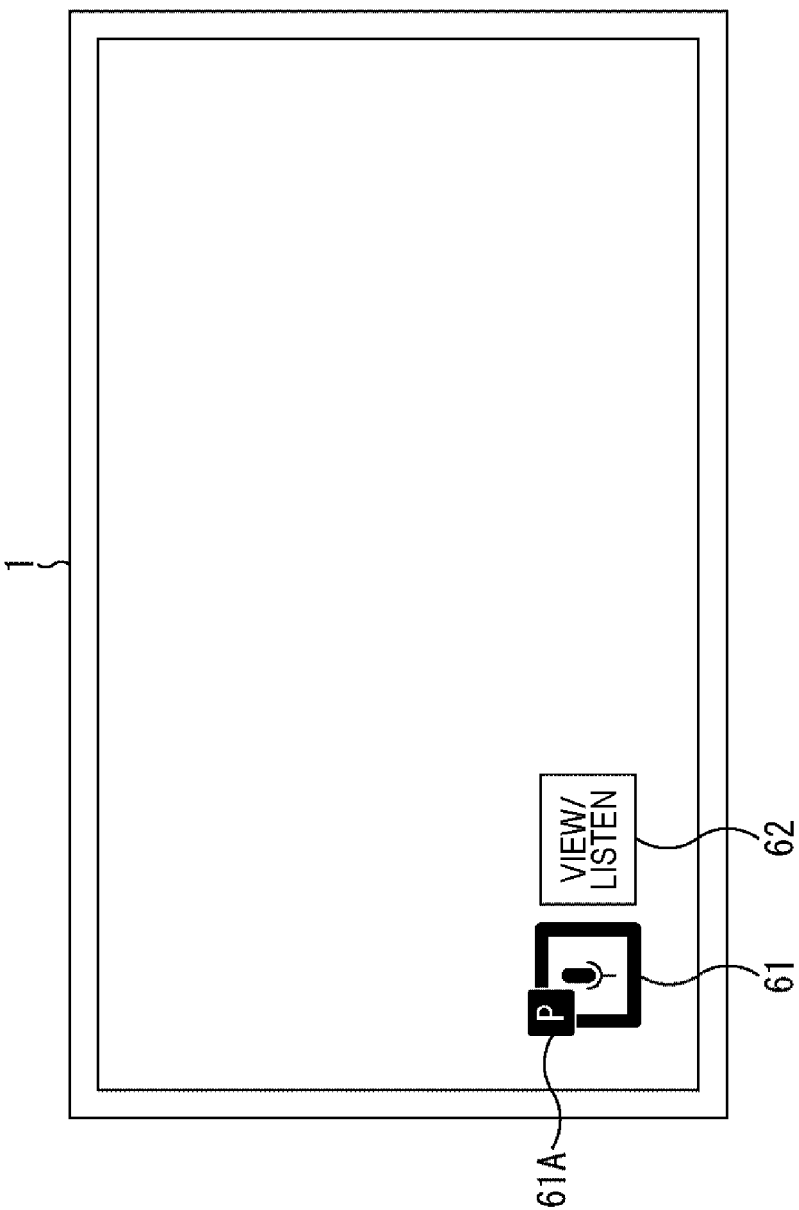
FIG. 8 is a diagram illustrating another example of presenting information.

FIG. 8 is a diagram illustrating another example of presenting information.

In the example of FIG. 8, a voice input mode icon 62 representing a voice input mode is displayed side by side with a voice input icon 61 indicating that voice input for voice operation is possible.

At the upper left of the voice input icon 61, a mark 61A, which is the letter "P", is displayed. The mark 61A indicates that the apparatus that can be operated by using voice is an external game console for example, connected to the TV 1.

The voice input mode icon 62, which is displayed to the right of the voice input icon 61 and includes characters "view/listen", represents the domain of utterance regarding display of the image of the external game console. Voice recognition for the voice input when the voice input mode icon 62 is displayed is performed by designating the domain of the utterance regarding display of the image of the external game console. For example, in a case where voice "Display game screen" is input, since the domain is designated, the content of the user's request is specified as displaying the image of the external game console.

As described, an icon indicating that voice for voice operation of an external apparatus connected to the TV 1 can be input may be displayed. Furthermore, an icon indicating that voice for voice operation of a predetermined application can be input may be displayed.

The icons described above are displayed not only on the display 113 of the TV 1 but also on the display 31 of the robot vacuum cleaner 21.

<<Configuration and Actions of Device>>
<Configuration of Control Device>

Figure 9:
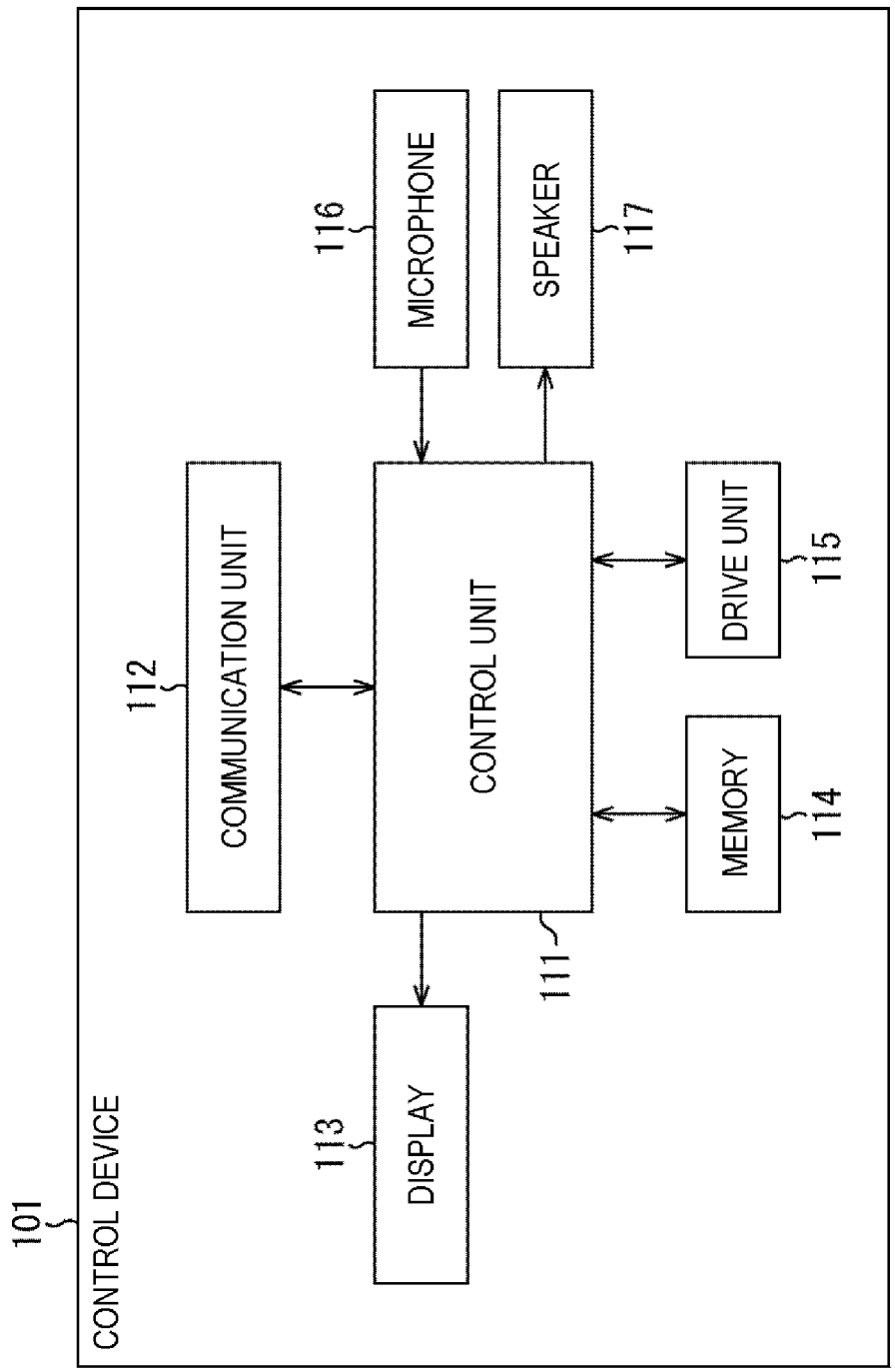
FIG. 9 is a block diagram illustrating a configuration example of a control device.

FIG. 9 is a block diagram illustrating a configuration example of a control device.

A control device 101 illustrated in FIG. 9 is mounted on various apparatuses serving as information processing devices such as the TV 1 and the robot vacuum cleaner 21. The configuration of the control device 101 differs appropriately depending on the apparatus on which the control device 101 is mounted.

As illustrated in FIG. 9, the control device 101 includes a control unit 111, a communication unit 112, a display 113, a memory 114, a drive unit 115, a microphone 116, and a speaker 117.

The control unit 111 includes a central processing unit (CPU), a read only memory (ROM), a random access memory (RAM), and the like. The control unit 111 executes a predetermined program and controls the overall actions of the control device 101.

The communication unit 112 transmits and receives various types of information to and from an external device via wireless or wired communication.

The display 113 includes a display such as an LCD or an organic EL display. Various types of information such as the image of a broadcast program are displayed on the display 113 depending on the apparatus on which the control device 101 is mounted. The above-described icons or the like are also displayed on the display 113. In a case where the control device 101 is provided in the robot vacuum cleaner 21, the display 31 is provided in lieu of the display 113. The display 113 may not be provided depending on the apparatus on which the control device 101 is mounted.

The memory 114 includes a non-volatile memory or the like. The memory 114 stores various types of data such as a program executed by the CPU of the control unit 111.

The drive unit 115 performs an action to realize the function of the apparatus on which the control device 101 is mounted.

For example, in a case where the control device 101 is mounted on the TV 1, the drive unit 115 performs various processes such as reception of broadcast waves and signal processing for received signals. The image of the broadcast program obtained by performing various processes is displayed on the display 113. The drive unit 115 switches between power on/off (turns on/off the power) as appropriate according to control by the control unit 111.

Furthermore, in a case where the control device 101 is mounted on the robot vacuum cleaner 21, the drive unit 115 drives the wheel and a suction motor to move the robot vacuum cleaner 21 while cleaning. The drive unit 115 appropriately switches between the standby state and the activated state of the robot vacuum cleaner 21 according to control by the control unit 111.

The microphone 116 detects voice of the user. The voice detected by the microphone 116 is supplied to the control unit 111.

The speaker 117 responds to an utterance of the user by outputting synthetic voice according to control by the control unit 111.

The control device 101 is appropriately provided with a camera or various sensors depending on the apparatus on which the control device 101 is mounted. Examples of the sensors provided in the control device 101 include an illuminance sensor that detects the brightness of the surroundings, a distance measuring sensor that measures the distance to an object in the surroundings, and a positioning sensor that uses a global positioning system (GPS). An image captured by the camera and the detection result obtained by the sensor are used, for example, for recognizing the surrounding state.

Figure 10:
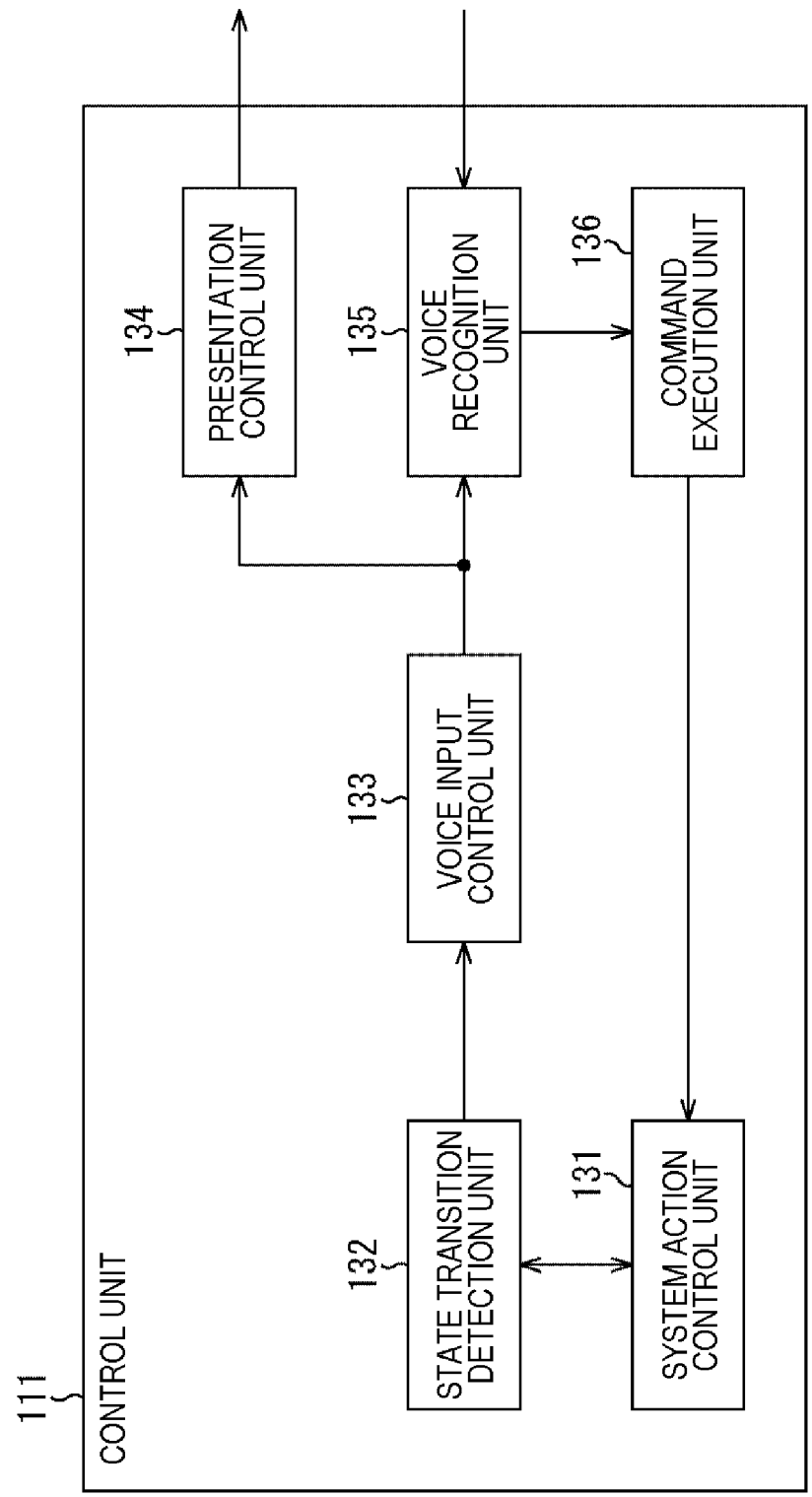
FIG. 10 is a block diagram illustrating a functional configuration example of the control device.

FIG. 10 is a block diagram illustrating a functional configuration example of the control device.

As illustrated in FIG. 10, in the control unit 111, a system action control unit 131, a state transition detection unit 132, a voice input control unit 133, a presentation control unit 134, a voice recognition unit 135, and a command execution unit 136 are realized. At least some of the functional units illustrated in FIG. 10 are realized by executing a predetermined program by the CPU constituting the control unit 111 of FIG. 9.

The system action control unit 131 manages the state of the apparatus (system) on which the control device 101 is mounted, and controls the action of the apparatus by driving the drive unit 115. For example, the system action control unit 131 drives the drive unit 115 according to control by the command execution unit 136.

The state transition detection unit 132 monitors the state of the system managed by the system action control unit 131 and detects state transition. In a case where the state transition detection unit 132 detects a predetermined state transition that becomes a trigger for stating input of voice operation without an activation word, the state transition detection unit 132 outputs information indicating that the predetermined state transition is detected to the voice input control unit 133. Information indicating the content of the state transition is also output to the voice input control unit 133.

For example, in a case where a transition to a state in which the power is automatically turned off has been detected by the no operation power off function, information indicating that the state transition that becomes a trigger is detected is output together with information indicating the content of the state transition.

In a case where information indicating that a state transition that becomes a trigger has been detected is supplied to the voice input control unit 133 from the state transition detection unit 132, the voice input control unit 133 determines the domain of utterance which is a target for voice recognition according to the content of the state transition. For example, in a case where a transition to a state in which the power is automatically turned off by the no operation power off function is detected, the domain of utterance regarding the no operation power off function is determined as the domain of the utterance which is a target for voice recognition.

The voice input control unit 133 outputs information indicating that acceptance of voice operation without an activation word is started and information representing the domain that has been determined. Information output from the voice input control unit 133 is supplied to the presentation control unit 134 and the voice recognition unit 135.

The presentation control unit 134 presents information indicating that voice operation is possible and information representing the voice input mode on the basis of the information supplied from the voice input control unit 133. For example, the presentation control unit 134 presents the pieces of information described above by displaying icons on the display 113 or causing the LED to emit light.

The voice recognition unit 135 performs voice recognition for the user's voice that is input for voice operation and is detected by the microphone 116. Voice recognition by the voice recognition unit 135 is performed by designating the domain represented by information supplied from the voice input control unit 133. The voice recognition unit 135 outputs a voice command according to the content of the user's request specified by voice recognition to the command execution unit 136.

The command execution unit 136 executes the voice command supplied from the voice recognition unit 135, and causes the system action control unit 131 to perform a process according to the voice command.

It is also possible that at least some of the functional units illustrated in FIG. 10 are realized in an external device connected via a network.

Figure 11:
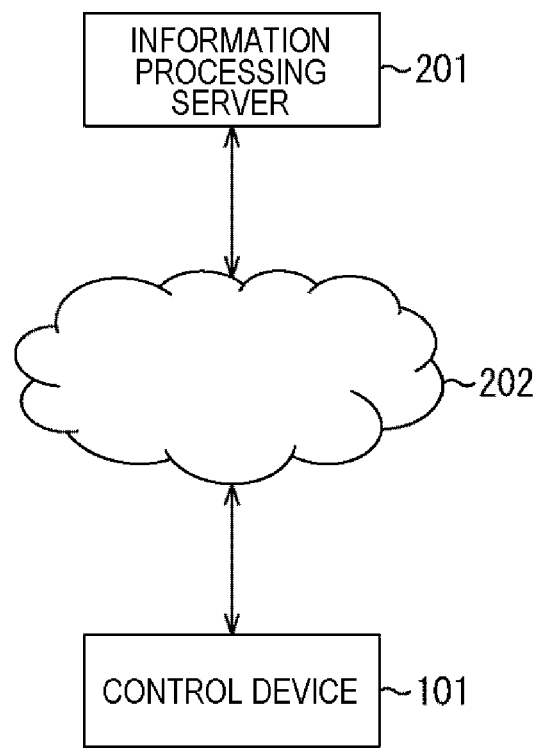
FIG. 11 is a diagram illustrating a configuration example of an information processing system.

FIG. 11 is a diagram illustrating a configuration example of an information processing system.

The information processing system illustrated in FIG. 11 is configured by connecting the control device 101 and an information processing server 201 via a network 202 such as the Internet. Various types of information are transmitted and received between the control device 101 and the information processing server 201 via the network 202.

For example, in a case where the voice recognition unit 135 of FIG. 10 is realized in the information processing server 201, the user's voice detected by the control device 101 is transmitted to the information processing server 201. In the information processing server 201, voice recognition is performed for the user's voice, and information representing the voice recognition result is transmitted to the control device 101. In the control device 101, a voice command according to the content of the user's request is executed on the basis of information transmitted from the information processing server 201, and a predetermined action is performed.

As described, it is also possible to realize the above-described functions by linking a plurality of devices.

<Action of Control Device>

Figure 12:
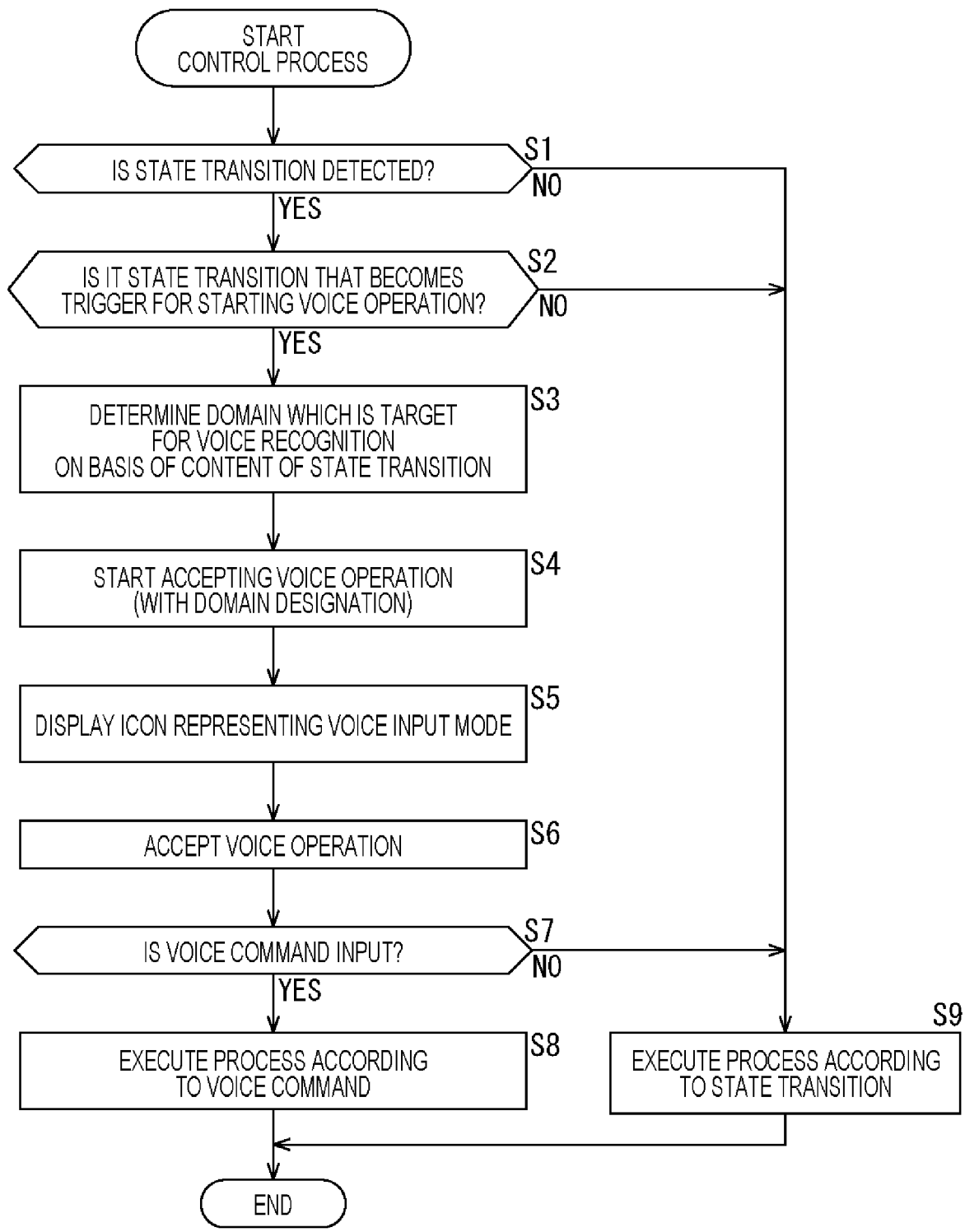
FIG. 12 is a flowchart explaining actions of the control device.

Here, actions of the control device 101 having the configuration as described above will be described with reference to the flowchart of FIG. 12.

In step S1, the state transition detection unit 132 monitors the state of the system managed by the system action control unit 131, and judges whether or not state transition is detected.

In a case where it is judged in step S1 that state transition is detected, the state transition detection unit 132 judges in step S2 whether or not the state transition that is detected is state transition that becomes a trigger for starting input of voice operation without an activation word.

In a case where it is judged in step S2 that the state transition becomes a trigger, the voice input control unit 133 determines in step S3 the domain of utterance which is a target for voice recognition on the basis of the content of the state transition.

In step S4, the voice input control unit 133 starts accepting voice operation by outputting information indicating that acceptance of the voice operation without an activation word is started and information representing the domain that has been determined.

In step S5, the presentation control unit 134 displays an icon indicating that voice for voice operation can be input and an icon representing the voice input mode on the basis of information supplied from the voice input control unit 133.

In step S6, the voice recognition unit 135 accepts the user's voice input for voice operation detected by the microphone 116. Furthermore, the voice recognition unit 135 designates the domain and performs voice recognition for the user's voice.

In step S7, the command execution unit 136 judges whether or not a voice command is input on the basis of the result of voice recognition by the voice recognition unit 135.

In a case where it is judged in step S7 that the voice command is input, the command execution unit 136 executes the process corresponding to the voice command and terminates the process in step S8.

For example, in a case where a transition to a state in which the power is automatically turned off by the no operation power off function is detected, voice operation without an activation word is started to be accepted. At this time, an icon or the like indicating that voice input for voice operation is possible is displayed. In a case where the utterance "Don't turn off" is made without uttering an activation word, it is recognized by voice recognition that the utterance is a request to stop power off, and the process for stopping power off is performed in response to the voice command.

In contrast, in a case where it is judged in step S1 that state transition is not detected, or in a case where it is judged in step S2 that the state transition that is detected is not state transition that becomes a trigger, the system action control unit 131 executes in step S9 the process according to the state transition.

In the case of the example described above, as a process according to the state transition, a process of automatically turning off the power by the no operation power off function is performed.

Similarly, in a case where it is judged in step S7 that no voice command is input, the process is terminated after the process corresponding to the state transition is executed in step S9.

As described above, since voice recognition is performed in a form in which the domain corresponding to the state transition is designated by using the system state transition as a trigger, the user can perform voice operation by making an utterance that is usually used while omitting an activation word. That is, the user can perform intuitive voice operation.

Application Example

It is possible to adopt various state transitions other than the above-described state transitions as state transitions that become triggers for voice operation without an activation word.

Furthermore, various domains other than the above-described domains can be adopted as domains of utterance to be targets for voice recognition.

Hereinafter, the state transition following "Trigger:" represents the state transition that becomes a trigger for voice operation without an activation word. The process following "Judgment:" indicates that voice operation without an activation word becomes possible after judgment using the process has been made. The content following "Domain:" represents the domain of utterance to be a target for voice recognition. The content following "Presentation:" represents the manner of presentation to the user.

<Example Applied to TV>

Automatic Power Off Function

The automatic power off function is a function of automatically turning off the power (function of setting a standby state).

Trigger:

Transition to the state where it is after preset time point

Transition to the state where no operation time becomes a certain period of time or longer Judgment:

By analyzing an image captured by the camera or voice detected by the microphone, it is recognized whether or not the user is nearby, and in a case where the user is nearby, acceptance of voice operation without an activation word is started.

Domain:

Utterance regarding power off

Presentation:

Presentation is made to the user by displaying a message such as "Is it okay to turn off the power?".

For example, in a case where an utterance such as "Yeah" is made, the utterance is accepted as voice operation and the power is turned off.

Continuous Video Playback Function

The continuous video playback function is a function of continuing playing another video in a case where playback of a video distributed online or a recorded video is finished.

Trigger:

Transition to the state where playback of the currently playing video has finished Judgment:

In a case where state transition occurs, acceptance of voice operation is unconditionally started.

Domain:

Utterance regarding selection of playback target

Presentation:

For example, it is assumed that a plurality of next playback candidates is presented on the screen, and selection by voice operation is possible. The number or title is displayed for each playback candidate.

In a case where an utterance including the number or title such as "No. 1", "(Title)", or "Do not play" is made, input of voice operation is accepted. Since the target for utterance is fixed, recognition accuracy will be improved.

Automatic Activation Function

The automatic activation function is a function of automatic activation from the standby state.

Trigger:

Transition to the state where it is after the start point time of the broadcast program which is likely to be viewed/listened A broadcast program which is likely to be viewed/listened is specified on the basis of the past viewing/listening history or recording history of broadcast programs using broadcast waves or online broadcast programs. Acceptance of voice operation without an activation word may be started by using as a trigger transition to the state where earthquake information or breaking news has been received.

Judgment:

By analyzing an image captured by the camera or voice detected by the microphone, it is recognized whether or not the user is nearby, and in a case where the user is nearby, acceptance of voice operation is started.

Domain:

Utterance regarding whether or not to perform activation

Presentation:

For example, activation is performed with the voice muted and presentation to the user is performed by displaying a message inquiring whether to perform playback as it is.

For example, in a case where an utterance such as "Turn on as it is", "Turn on", or "Show" is made, the utterance is accepted as voice operation and display of the broadcast program is continued.

Eye Protection Function

The eye protection function is a function of automatically shifting the display mode of the display 113 to a protection mode that is easy on the eyes of the user. The protection mode includes a display mode that reduces blue light and a display mode that adjusts luminance before going to bed.

Trigger:

Transition to the state where it is after a specific time point

Transition to the state where luminance change has been detected

For example, the detection result of the luminance sensor is used to detect state transition that becomes a trigger.

Judgment:

Acceptance of voice operations is started according to the behavioral tendency of the user which is specified by analyzing the image captured by the camera or the voice detected by the microphone. For example, a user preference specified on the basis of bedtime or a history of past setting changes regarding the blue light mode is used to judge whether or not to start accepting voice operation.

Domain:

Utterance regarding whether or not to shift to a mode easy on eyes

Presentation:

For example, presentation to the user is performed by displaying the message "Luminance is being lowered".

For example, in a case where an utterance such as "Stop" is made, the utterance is accepted as voice operation, transition to the mode easy on the eyes is stopped, and display luminance is returned to the original luminance.

Input Switching Function

The input switching function is a function of automatically switching the display content of the display 113.

Trigger:

Transition to the state where new input is detected

Judgment:

In a case where state transition occurs, acceptance of voice operation is unconditionally started.

Domain 1:

Utterance regarding whether or not to switch to new input

Presentation:

Presentation is made to the user by displaying a message inquiring whether or not to switch to new input.

For example, in a case where an utterance such as "Switch" or "OK" is made, the utterance is accepted as voice operation, and the display content is switched according to the new input.

Domain 2:

Utterance regarding whether or not to return to original input

Presentation:

After switching the input, presentation to the user is made by displaying a message inquiring whether or not to return to the original input.

For example, in a case where an utterance such as "Return" or "Do not switch" is made, the utterance is accepted as voice operation, and the display content is switched to select the original input from the new input.

Function According to Input Loss

The function corresponding to input loss is the function of automatically turning off the power in a case where an input signal is lost.

Trigger:

Transition to the state where the input signal is lost

Transition to the state where the input signal line is disconnected in a case where an external signal has been input Domain:

Utterance regarding whether or not to turn off the power

Presentation:

For example, presentation to the user is made by displaying the message "Do you want to turn off the power?".

For example, in a case where an utterance such as "Turn off" is made, the utterance is accepted as voice operation and the power is automatically turned off.

Language Switching Function

The language switching function is a function of switching the language of the voice of the content.

Trigger:

Transition to content playback start state

Transition to power-on state

Judgment:

For example, on the basis of an image captured by the camera, it is recognized whether or not the user is nearby, and in a case where the user is nearby, acceptance of voice operation is started.

Domain:

Utterance regarding language switching

Presentation:

Presentation to the user is made by displaying a message prompting the user to select a language, such as "Which voice do you want?", while starting playback of the content with the conventional settings.

For example, in a case where an utterance such as "English" or "Japanese" is made, the utterance is accepted as voice operation and playback of the content continues by using the selected language.

Display Mode Switching Function

The display mode switching function is a function of automatically switching the display mode according to the display content.

Trigger:

Transition to the state where the subject of the content such as a game, a movie, sports, or the like is specified.

The subject of the content may be specified according to the result of image recognition or the input apparatus.

Domain:

Utterance regarding switching display mode

Presentation:

Presentation is made to the user by displaying a message suggesting the switching content, such as "Do you want to switch to the game mode?".

For example, in a case where an utterance such as "Yes" is made, the utterance is accepted as voice operation, and the display mode is switched according to the suggested content.

Change Suppression Function

The change suppression function is a function of enabling input of a command for suppressing a sudden change in the output setting in a case of the sudden change.

Trigger:

Transition to the state where the volume of the speaker is higher than a threshold along with switching of the input source or switching of the video to be played Domain 1:

Utterance regarding lowering the volume

Presentation:

Presentation is made to the user by displaying a message suggesting that the volume be lowered, such as "Do you want to lower the volume?".

For example, in a case where an utterance such as "Yeah" is made, the utterance is accepted as voice operation, and the setting is changed so that the volume is lowered according to the suggested content.

Domain 2:

Utterance regarding returning to the previous state

Presentation:

Presentation is made to the user by displaying a message suggesting that the state be returned, such as "Do you want to return?".

For example, in a case where an utterance such as "Return!" is made, the utterance is accepted as voice operation, and the input source or the video to be played are changed so that the state is returned according to the suggested content.

Notification Function

The notification function is a function of notifying the user of various types of information.

(1) Notification 1

Trigger:

Transition to the state where it is detected that a new video has been updated

Domain:

Utterance regarding whether to play a video now, receive a reminder later, transmit a video, or buy a video Presentation:

Presentation is made to the user by displaying a message such as "A new video has been released. Do you want it to be played?".

For example, in a case where an utterance such as "Yeah", "Later", or "Download" is made, the utterance is accepted as voice operation, and playback of the video is started according to the suggested content.

(2) Notification 2

Trigger:

Transition to the state where it is detected that there is content whose rental service is about to end when the power is turned on or while the content is normally viewed/listened Domain:

Utterance regarding whether to update automatically, stop, or watch from now on

Presentation:

Presentation is made to the user by displaying a message such as "The rental period will be over".

For example, in a case where an utterance such as "Play now" is made, the utterance is accepted as voice operation and playback of the content is started.

(3) Notification 3

Trigger:

Transition to the state where it is detected that there is a change in the online status (login status) of an acquaintance during performance of an online player-versus-player game Domain:

Utterance regarding invitation to compete in a game you are playing (4) Notification 4

Trigger:

Transition to the state where it is detected that there has been an invitation to compete while playing an online player-versus-player game Domain:

Utterances regarding reason why it's difficult to join the game

Presentation:

Presentation is made to the user by displaying a message such as "What do you want to tell?".

For example, in a case where an utterance such as "I can't right now" or "Join in 10 minutes" is made, the utterance is accepted as voice operation and a stamp indicating the content of utterance is sent to the inviter.

(5) Notification 5

Trigger:

Transition to the state where it is detected that there has been an important notification to a linked apparatus For example, in a case where there is an incoming call to the user's smartphone while viewing/listening a video, such state transition is detected as a trigger. The TV 1 can monitor the status of the user's smartphone and detect the status of the smartphone.

Domain:

Utterance regarding stopping video playback

Presentation:

Presentation is made to the user by displaying a message such as "Do you want to stop playing the video?".

For example, in a case where an utterance such as "Yeah" is made, the utterance is accepted as voice operation and playback of the video is stopped.

(6) Notification 6

Trigger:

Transition to the state where it is detected that incoming call to the smartphone as an interrupt event has ended in a case where video playback is stopped in response to an occurrence of the state transition of notification 5 described above Domain:

Utterance regarding playing the continuation

Presentation:

Presentation is made to the user by displaying a message such as "Do you want to play the continuation of the video that was played just now?".

For example, in a case where an utterance such as "Yeah" is made, the utterance is accepted as voice operation and playback of the video is resumed.

Sensing Function

The sensing function is a function of recognizing an action of the user on the basis of an image analysis result, a voice analysis result, or a sensor data analysis result, and performing processing according to the action of the user.

Trigger:

Transition to the state where it is detected that the user is responding to the incoming call on the smartphone For example, in a case where there is an incoming call on the smartphone of the user who is viewing/listening a video, such state transition is detected as a trigger.

Domain:

Utterance regarding lowering the volume or stopping video playback

Presentation:

Presentation is made to the user by displaying a message such as "Do you want to lower the volume?".

For example, in a case where an utterance such as "Yeah" is made, the utterance is accepted as voice operation and the volume of the video is lowered.

<Example Applied to Apparatus Other than TV>

Application to various apparatuses other than a TV is possible.

Air Conditioner (1) Example 1

Trigger:

Transition to the state where it is detected that the temperature becomes equal to or lower than a certain temperature after cooling is started Domain:

Utterance regarding adjusting air conditioning intensity

The domain may be changed as appropriate on the basis of the past operation history of the user.

Presentation:

Presentation is made to the user by displaying a message such as "Since the temperature has reached the predetermined temperature, the mode is switched to the temperature maintenance mode."

For example, in a case where an utterance such as "Cool a little more" is made, the utterance is accepted as voice operation and cooling is strengthened.

(2) Example 2

Trigger:

Transition to the state where movement of a person in the room is detected

Judgment:

Who is the person who has moved is identified on the basis of an image captured by the camera, and the wind direction stops following according to the identification result.

Domain:

Utterance regarding stop of wind direction following

Presentation:

Presentation is made to the user by displaying a message such as "Wind direction will be changed". Presentation to the user may be performed by a sound effect.

IH Cooking Heater

Trigger:

Transition to the state where boiling over is detected

Domain:

Utterance regarding heat adjustment (heat amount adjustment)

Presentation:

Presentation is made to the user by displaying a message such as "Heat level will be changed".

For example, in a case where an utterance such as "Low heat" is made, the utterance is accepted as voice operation and the amount of heat is suppressed.

Washing Machine

Trigger:

Transition to the state where it is detected that it's starting to rain

Domain:

Utterance regarding taking in the laundry

Presentation:

Presentation is made to the user by displaying a message such as "It's starting to rain".

For example, in a case where an utterance such as "Take in" is made, the utterance is accepted as voice operation, and a robot that cooperates with the washing machine takes in the laundry that is hung outside.

Refrigerator (1) Example 1

Trigger:

Transition to the state where it is detected that the refrigerator door has opened Domain:

Utterance regarding registration on the shopping list

Presentation:

Presentation is made to the user by displaying a message such as "Do you need something?".

For example, in a case where an utterance such as "Register milk" is made, the utterance is accepted as voice operation and milk is registered on the shopping list. The refrigerator has a function of managing the products to be purchased registered by the user.

(2) Example 2

Trigger:

Transition to the state where it is detected that the food expiration date is approaching Domain:

Utterance regarding throwing away

Presentation:

Presentation to the user is made by displaying a message such as "There is food whose expiration date is approaching. Are you sure you want to throw it away?"

For example, in a case where utterance such as "OK" is made, the utterance is accepted as voice operation and managed as food to be discarded.

Lighting Apparatus

It is also possible that lighting be equipped with a function similar to the automatic power off function of the TV 1.

Entrance

Trigger:

Transition to the state where it is detected that there is a visitor

Domain:

Utterance regarding whether or not to receive the visitor

Presentation:

Presentation is made to the user by displaying a message such as "There has been a visitor".

Delivery Box

Trigger:

Transition to the state where the delivery is detected

Domain 1:

Utterance regarding when to pick up

Presentation:

Presentation is made to the user by displaying a message such as "A delivery has arrived".

For example, in a case where an utterance such as "Get it right now" is made, the utterance is accepted as voice operation and managed as a high-priority task. For example, the task of picking up a delivery is performed by a robot.

Domain 2:

Utterance regarding content check

For example, in a case where an utterance such as "What is it?", "Where did it come from?", or "From who?" is made, the utterance is accepted as voice operation and a response to an inquiry is made.

Robot Vacuum Cleaner (1) Example 1

Trigger:
Transition to the state where end of cleaning is detected
Domain:
Utterance regarding continuing cleaning (2) Example 2

Trigger:
Transition to the state where it is detected that a large size of trash has been caught in
Domain:
Utterance regarding action stop Microwave Trigger:
Transition to each temperature state
Domain:
Utterance regarding reheating Dryer Trigger:
Transition to the state where it is detected that the laundry is still damp
Domain:
Utterance regarding redrying <Example Applied to Accessibility>

Application to accessibility (auxiliary function) such as information read-aloud is also possible.

(1) Example 1

Trigger:
Transition to the state where power-on of the apparatus is detected
Judgment:
By analyzing an image captured by the camera or voice detected by the microphone, it is recognized whether or not the user is nearby, and in a case where the user is nearby, acceptance of voice operation without an activation word is started.
Domain:
Utterance regarding activation of read-aloud function (2) Example 2

Trigger:
Transition to the state where it is detected that the target to be focused on by the user has been switched
Domain:
Utterance regarding end of read-aloud function <<Others>>

It is assumed that both an icon indicating that voice for voice operation can be input and an icon representing the domain of utterance in which voice operation is possible by an utterance without an activation word are displayed; however, one of the icons may be displayed.

It is assumed that the fact that voice for voice operation can be input and the domain of utterance in which voice operation is possible by an utterance without an activation word are presented by display of icons; however, it is also possible to present them by another method. For example, such information may be presented by outputting voice, or such information may be presented by light emission of a light emitting unit such as an LED.

Computer Configuration Example

The series of processes described above can be performed by hardware or can be performed by software. In a case of executing the series of processes by software, a program that constitutes the software is installed from a program recording medium into a computer built into dedicated hardware, a general-purpose computer, or the like.

FIG. 13 is a block diagram illustrating an example of a hardware configuration of a computer that executes the series of processes described above according to a program.

An information processing server 201 that realizes part of the configuration illustrated in FIG. 10 includes a computer having the configuration illustrated in FIG. 13.

A central processing unit (CPU) 1001, a read only memory (ROM) 1002, and a random access memory (RAM) 1003 are mutually connected by a bus 1004.

Moreover, an input/output interface 1005 is connected to the bus 1004. An input unit 1006 including a keyboard, a mouse, or the like, and an output unit 1007 including a display, a speaker, or the like are connected to the input/output interface 1005. Furthermore, a storage unit 1008 including a hard disk, a non-volatile memory, or the like, a communication unit 1009 including a network interface, or the like, and a drive 1010 that drives a removable medium 1011 are connected to the input/output interface 1005.

In the computer configured as described above, the CPU 1001, for example, loads the program stored in the storage unit 1008 into the RAM 1003 via the input/output interface 1005 and the bus 1004 and executes the program, and thus the above-described series of processes is performed.

The program executed by the CPU 1001 is recorded, for example, on the removable medium 1011 or provided via a wired or wireless transmission medium such as a local area network, the Internet, or digital broadcasting, and installed into the storage unit 1008.

Note that the program executed by the computer may be a program that performs processes in chronological order according to the order described in the present specification, or may be a program that performs processes in parallel, or at necessary timing, such as when a call is made.

In the present Description, a system means a set of a plurality of constituents (devices, modules (components), or the like), and it does not matter whether or not all the constituents are in the same housing. Therefore, each of a plurality of devices accommodated in separate housings and connected via a network, and one device in which a plurality of modules is accommodated in one housing are a system.

The effects described in the present Description are illustrations only and not limited, and may have other effects.

The embodiments of the present technology are not limited to the above-described embodiments, and various modifications can be made without departing from the scope of the present technology.

For example, the present technology can adopt a configuration of cloud computing in which one function is shared and processed jointly by a plurality of devices via a network.

Furthermore, each step described in the above-described flowchart can be executed by one device, or can be shared and executed by a plurality of devices.

Moreover, in a case where a plurality of processes is included in one step, the plurality of processes included in the one step can be shared and executed by a plurality of devices in addition to being executed by one device.

<Examples of Configuration Combinations>

The present technology can also be configured as follows.

(1)

An information processing device including
- a presentation control unit that presents first information indicating that voice for voice operation can be input and second information representing a domain of utterance in which voice operation is possible in response to an occurrence of a predetermined state transition, and
- a voice recognition unit that performs voice recognition for voice input by a user.

(2)

The information processing device according to the (1), in which the voice recognition unit performs the voice recognition for voice of an utterance belonging to the domain, the voice being input by the user after the first information and the second information are presented.

(3)

The information processing device according to the (1) or (2), in which the voice recognition unit performs the voice recognition for voice input by the user without recognizing a word that becomes an activation trigger.

(4)

The information processing device according to any one of the (1) to (3) further including
- a voice input control unit that determines the domain on the basis of content of the predetermined state transition,
- in which the presentation control unit presents the second information representing the domain determined by the voice input control unit.

(5)

The information processing device according to the (2), in which the presentation control unit presents a plurality of pieces of the second information that represents a plurality of types of the domains.

(6)

The information processing device according to any one of the (1) to (5) further including
- a state transition detection unit that detects the predetermined state transition which becomes a trigger for starting to accept voice operation.

(7)

The information processing device according to any one of the (1) to (6) further including
- an action control unit that controls an action of an apparatus to be controlled on the basis of a result of the voice recognition.

(8)

The information processing device according to the (7), in which the presentation control unit presents the first information and the second information in response to an occurrence of state transition for turning off power of the apparatus as the predetermined state transition, and
- the action control unit controls an action of the apparatus such that turning off the power is stopped on the basis of a result of the voice recognition.

(9)

The information processing device according to the (7), in which the presentation control unit presents the first information and the second information in response to an occurrence of state transition for turning on the power of the apparatus as the predetermined state transition, and
- the action control unit controls an action of the apparatus such that turning on the power is stopped on the basis of a result of the voice recognition.

(10)

The information processing device according to any one of the (1) to (9),
- in which the presentation control unit causes a display unit to display the first information and the second information.

(11)

The information processing device according to the (10),
- in which the presentation control unit displays an icon indicating that voice can be input as the first information and displays an icon representing the domain as the second information.

(12)

The information processing device according to any one of the (1) to (9),
- in which the presentation control unit presents the first information and the second information with voice.

(13)

The information processing device according to any one of the (1) to (9),
- in which the presentation control unit presents the first information and the second information by causing a light emitting unit to emit light.

(14)

An information processing method including
- by using an information processing device, presenting first information indicating that voice for voice operation can be input and second information representing a domain of utterance in which voice operation is possible according to an occurrence of a predetermined state transition, and
- by using the information processing device, performing voice recognition for voice input by a user.

(15)

A program for causing a computer to execute a process, the process including:
- presenting first information indicating that voice for voice operation can be input and second information representing a domain of utterance in which voice operation is possible in response to an occurrence of a predetermined state transition; and
- performing voice recognition for voice input by a user.

REFERENCE SIGNS LIST

1 TV
21 Robot vacuum cleaner
101 Control device
111 Control unit
131 System action control unit
132 State transition detection unit
133 Voice input control unit
134 Presentation control unit
135 Voice recognition unit
136 Command execution unit

The invention claimed is:

1. An information processing device, comprising:
a presentation control unit configured to present, based on an occurrence of a specific state transition, first information that indicates voice for voice operation is input and second information that represents a domain of utterance of the voice, wherein
the specific state transition is turning off power of the information processing device, and
the power of the information processing device is turned off in a case a time point set for the turn off of the power of the information processing device is reached;
a voice recognition unit configured to recognize the voice input by a user; and
an action control unit configured to control, based on a result of the voice recognition, an action of the information processing device to stop the turn off of the power, wherein
the time point set for the turn off of the power of the information processing device is extended by a specific time to stop the turn off of the power of the information processing device.

2. The information processing device according to claim 1, wherein
the voice recognition unit is further configured to recognize the voice of the utterance belonging to the domain, and
the voice is input by the user after the first information and the second information are presented.

3. The information processing device according to claim 2, wherein
the presentation control unit is further configured to present a plurality of second information that represents a plurality of domains,
the plurality of second information includes the second information, and
the plurality of domains includes the domain.

4. The information processing device according to claim 1, wherein the voice recognition unit is further configured to recognize the for voice input by the user without recognition of a word that becomes an activation trigger.

5. The information processing device according to claim 1, further comprising a voice input control unit configured to determine the domain based on content of the specific state transition, wherein
the presentation control unit is further configured to present the second information that represents the domain determined by the voice input control unit.

6. The information processing device according to claim 1, further comprising a state transition detection unit configured to detect the specific state transition which becomes a trigger to accept voice operation.

7. The information processing device according to claim 1, wherein the presentation control unit is further configured to control a display unit to display the first information and the second information.

8. The information processing device according to claim 7, wherein the presentation control unit is further configured to control the display unit to display:

a first icon that indicates the voice is input as the first information, and
a second icon that represents the domain as the second information.

9. The information processing device according to claim 1, wherein the presentation control unit is further configured to present the first information and the second information with the voice.

10. The information processing device according to claim 1, wherein the presentation control unit is further configured to present the first information and the second information with a light emitting unit to emit light.

11. An information processing method, comprising:
an information processing device:
presenting, based on an occurrence of a specific state transition, first information that indicates voice for voice operation is input and second information that represents a domain of utterance of the voice, wherein
the specific state transition is turning off power of the information processing device, and
the power of the information processing device is turned off in a case a time point set for the turn off of the power of the information processing device is reached;
recognizing the voice input by a user; and
controlling, based on a result of the voice recognition, an action of the information processing device to stop the turn off of the power, wherein
the time point set for the turn off of the power of the information processing device is extended by a specific time to stop the turn off of the power of the information processing device.

12. A non-transitory computer-readable medium having stored thereon, computer-executable instructions which, when executed by an information processing device, cause the information processing device to execute operations, the operations comprising:
presenting, based on an occurrence of a specific state transition, first information that indicates voice for voice operation is input and second information that represents a domain of utterance of the voice, wherein
the specific state transition is turning off power of the information processing device, and
the power of the information processing device is turned off in a case a time point set for the turn off of the power of the information processing device is reached;
recognizing the voice input by a user; and
controlling, based on a result of the voice recognition, an action of the information processing device to stop the turn off of the power, wherein
the time point set for the turn off of the power of the information processing device is extended by a specific time to stop the turn off of the power of the information processing device.

* * * * *